(12) United States Patent
Koike et al.

(10) Patent No.: US 7,189,789 B2
(45) Date of Patent: Mar. 13, 2007

(54) CURABLE FLUOROPOLYETHER COMPOSITION AND RUBBER ARTICLE

(75) Inventors: Noriyuki Koike, Gunma-ken (JP); Takashi Matsuda, Gunma-ken (JP); Yasunori Sakano, Gunma-ken (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 382 days.

(21) Appl. No.: 10/621,389

(22) Filed: Jul. 18, 2003

(65) Prior Publication Data

US 2004/0034135 A1 Feb. 19, 2004

(30) Foreign Application Priority Data

Jul. 22, 2002 (JP) .............................. 2002-212658

(51) Int. Cl.
  *B06C 1/00* (2006.01)
  *C08K 3/34* (2006.01)
  *C08F 8/00* (2006.01)
  *C08F 32/00* (2006.01)
  *C08F 4/06* (2006.01)
  *C08F 4/42* (2006.01)

(52) U.S. Cl. .................. 525/326.1; 524/260; 524/493; 524/789; 526/126; 526/154; 526/247; 526/252

(58) Field of Classification Search ........ 524/260–590; 525/326.1; 526/194, 247
See application file for complete search history.

(56) References Cited

U.S. PATENT DOCUMENTS

| | | | | |
|---|---|---|---|---|
| 5,665,794 A | * | 9/1997 | Maxson et al. | 523/209 |
| 6,040,400 A | * | 3/2000 | Fukuda et al. | 526/126 |
| 6,441,079 B2 | * | 8/2002 | Sato et al. | 524/448 |
| 2003/0120100 A1 | | 6/2003 | Koike et al. | |

FOREIGN PATENT DOCUMENTS

| | | |
|---|---|---|
| EP | 1 217 025 A1 | 6/2002 |
| JP | 11-116685 A | 4/1999 |
| JP | 1217025 A1 * | 6/2002 |

* cited by examiner

*Primary Examiner*—Duane Smith
*Assistant Examiner*—Ives Wu
(74) *Attorney, Agent, or Firm*—Birch, Stewart, Kolasch & Birch, LLP

(57) ABSTRACT

A curable fluoropolyether composition comprising (A) a fluoropolyether compound containing alkenyl radicals and having a fluorine content of at least 40% by weight, (B) a curing agent in the form of a fluorinated organosilicon compound which is fully soluble in the fluoropolyether compound, and (C) a hydrosilylation catalyst, is curable at room temperature or under heat, has a low viscosity and transparency, and exhibits improved water repellence, oil repellence, solvent resistance, chemical resistance and weather resistance.

6 Claims, No Drawings

CURABLE FLUOROPOLYETHER COMPOSITION AND RUBBER ARTICLE

BACKGROUND OF THE INVENTION

1. Technical Field

This invention relates to a curable fluoropolyether composition which is curable at room temperature or under heat, has a low viscosity and high transparency, and exhibits improved water repellence, oil repellence, solvent resistance, chemical resistance and weather resistance.

2. Prior Art

Heretofore, curable fluoropolyether compositions have been used in a wide variety of applications owing to the properties of fluoroalkyl ether structure. For instance, JP-A 11-116685 discloses gel-like cured products of fluoropolyether having chemical resistance, solvent resistance and low moisture permeability. These gel-like cured products of fluoropolyether are utilized for the protection of semiconductor pressure sensors, electronic circuits and the like.

In general, curable fluoropolyether compositions are prepared by mixing a fluoropolyether compound as a base with a curing agent and a curing catalyst. It is desired that the curing agent and the curing catalyst be uniformly dissolved. For the curing agent in particular, choice must be made of the one which is highly soluble in the fluoropolyether compound because the curing agent is added in a larger amount than the hydrosilylation catalyst. If the curing agent is less soluble, the resulting composition becomes non-uniform and gives rise to undesirable phenomena including a remarkable increase of viscosity and phase separation during shelf storage.

It is known in the art that the solubility of the curing agent can be enhanced by incorporating a fluoroalkyl radical. One typical compound is of the following formula (2).

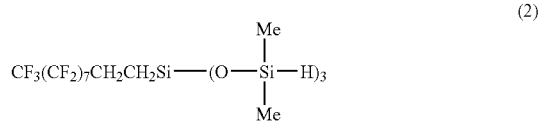

(2)

Herein and throughout the specification, Me is methyl.

This curing agent, however, has only three functional radicals per molecule. In general, the number of functional radicals on the crosslinking agent must be changed in order to adjust the hardness and physical properties (e.g., elongation) of cured products. Such a change is impossible with the above compound.

Also known is the curing agent having six functional radicals per molecule represented by the following formula (3).

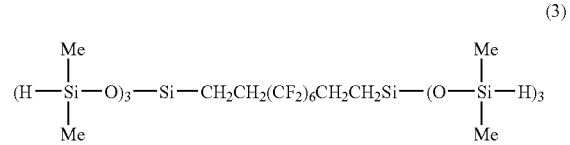

(3)

This curing agent affords a cured product with a higher hardness than the aforementioned trifunctional curing agent. Regrettably, this curing agent is insufficiently soluble in the fluoropolyether base on account of a low fluorine content.

The resulting composition becomes turbid and allows the respective components to separate during storage.

SUMMARY OF THE INVENTION

An object of the invention is to provide a curable fluoropolyether composition which has a low viscosity and high transparency and prevents separation after mixing.

It has been found that when a curing agent which is fully dissolvable even in a fluoropolyether compound having a high fluorine content is compounded, there is obtained a composition having a low viscosity, smooth flow, and transparency (or free of turbidity).

In one aspect, the present invention provides a curable fluoropolyether composition comprising (A) a fluoropolyether compound containing alkenyl radicals in a concentration of $3 \times 10^{-5}$ to $5 \times 10^{-3}$ mol/g and having a fluorine content of at least 40% by weight, (B) an organosilicon compound having the average compositional formula (1):

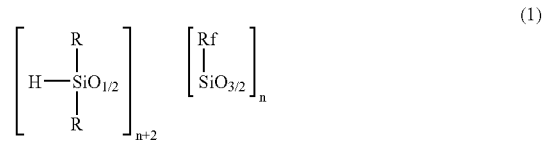

(1)

wherein R is an alkyl radical of 1 to 3 carbon atoms, Rf is a partially fluorinated alkyl radical of 3 to 16 carbon atoms or a partially fluorinated, ether bond-containing monovalent saturated radical, and n has an average value of 1.5 to 6.0, and (C) a hydrosilylation catalyst. Components (B) and (C) are used in effective amounts for component (A) to cure.

In another aspect, the invention provides a rubber article comprising the curable fluoropolyether composition in the cured state.

DETAILED DESCRIPTION OF THE INVENTION

Component (A) in the curable fluoropolyether composition of the invention is a fluoropolyether compound containing alkenyl radicals in a concentration of $3 \times 10^{-5}$ to $5 \times 10^{-3}$ mol/g and having a substituent fluorine content of at least 40% by weight. The fluoropolyether compound serves as a base polymer in the composition.

In the fluoropolyether compound (A), the concentration of alkenyl radicals attached to fluoropolyether is $3 \times 10^{-5}$ to $5 \times 10^{-3}$ mol/g, preferably $4 \times 10^{-5}$ to $2 \times 10^{-3}$ mol/g. If the concentration of alkenyl radicals attached to fluoropolyether is less than $3 \times 10^{-5}$ mol/g, effective cure is hindered on account of fewer crosslinking sites. In excess of $5 \times 10^{-3}$ mol/g of alkenyl radicals, too many crosslinking sites are available, resulting in a cured product which is brittle due to reduced "elongation."

The fluoropolyether compound should also have a fluorine content of at least 40% by weight, preferably at least 50% by weight. A fluorine content of less than 40% by weight leads to a cured product with poor chemical resistance and solvent resistance.

The fluoropolyether compound (A) is preferably derived from a perfluoropolyether.

The alkenyl radicals in the fluoropolyether compound are those having a $CH_2=CH-$ structure at an end such as vinyl, allyl, propenyl, isopropenyl, butenyl, and hexenyl, with the vinyl and allyl being especially preferred. The alkenyl radicals may be attached either directly to both ends of the backbone of the fluoropolyether compound or through a divalent linkage such as —$CH_2$—, —$CH_2O$— or —Y—NR—CO—. Herein Y is —$CH_2$— or a radical of the following structural formula:

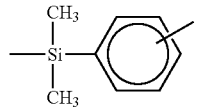

(the bond may be at o, m or p-position) and R is hydrogen, methyl, phenyl or allyl.

The perfluoroalkyl ether structure in the fluoropolyether compound includes those of the following general formula:

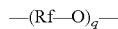

wherein Rf is a straight or branched perfluoroalkylene radical of 1 to 6 carbon atoms, preferably 1 to 3 carbon atoms, and letter q is an integer of 1 to 500, preferably 2 to 400, more preferably 10 to 200.

Examples of the recurring units —(Rf—O)— are shown below.

—$CF_2O$—, —$CF_2CF_2O$—, —$CF_2CF_2CF_2O$—, —$CF(CF_3)CF_2O$—, —$CF_2CF_2CF_2CF_2O$—, —$CF_2CF_2CF_2CF_2CF_2CF_2O$—, and —$C(CF_3)_2O$—. Of these, —$CF_2O$—, —$CF_2CF_2O$—, —$CF_2CF_2CF_2O$—, and —$CF(CF_3)CF_2O$— are preferred. It is understood that the perfluoroalkyl ether structure may consist of recurring units —(Rf—O)— of one type or recurring units of two or more types.

Typical of the fluoropolyether compound (A) are those of the following general formula (4).

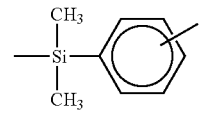

(the bond may be at o, m or p-position) and $R^1$ is hydrogen, methyl, phenyl or allyl, X' is independently selected from among —$CH_2$—, —$OCH_2$— and —CO—$NR^2$—Y'—, wherein Y' is —$CH_2$— or a radical of the following structural formula (Z'):

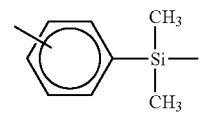

(the bond may be at o, m or p-position) and $R^2$ is hydrogen, methyl, phenyl or allyl, letter p is independently equal to 0 or 1, L is an integer of 2 to 6, and m and n each are an integer of 0 to 200, preferably 5 to 100. These fluoropolyether compounds have a molecular weight of about 400 to 100,000 and preferably about 1,000 to 50,000.

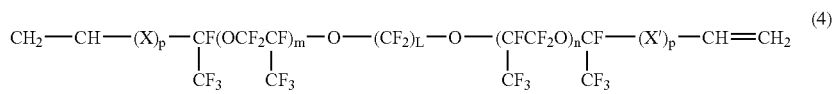

In formula (4), X is independently selected from among —$CH_2$—, —$CH_2O$— and —Y—$NR^1$—CO—, wherein Y is —$CH_2$— or a radical of the following structural formula (Z):

Illustrative examples of the fluoropolyether compound of formula (4) are given below. In the following formulae, m and n are as defined above.

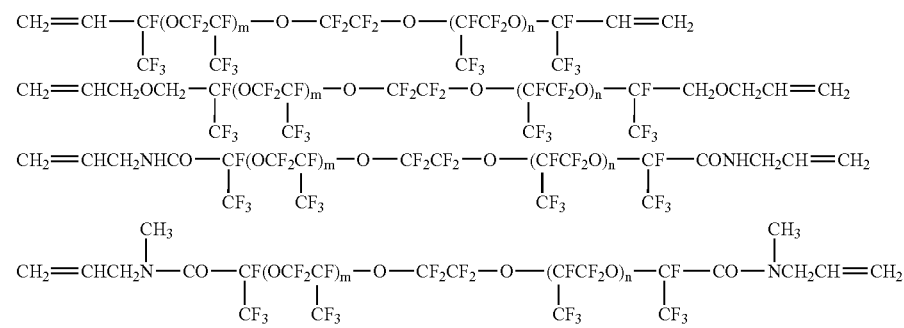

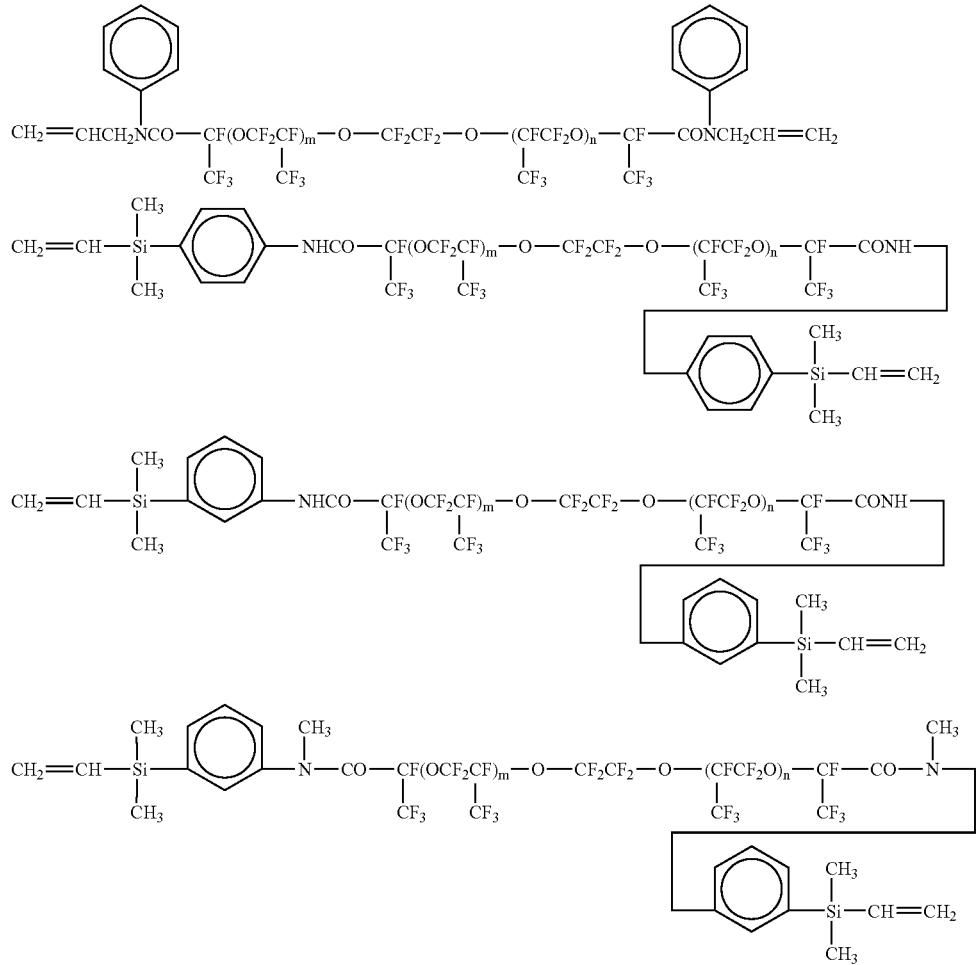

These fluoropolyether compounds may be used alone or in admixture of two or more.

Component (B) is an organosilicon compound having the average compositional formula (1) which serves as a crosslinking agent or chain extender.

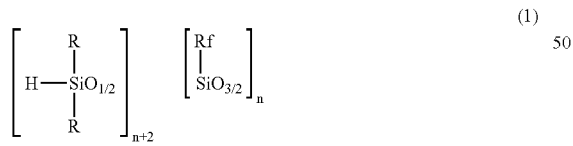

Herein R is an alkyl radical of 1 to 3 carbon atoms, Rf is a partially fluorinated alkyl radical of 3 to 16 carbon atoms or a partially fluorinated, ether bond-containing monovalent saturated radical, and n has an average value of 1.5 to 6.0.

More particularly, R is an alkyl radical of 1 to 3 carbon atoms, such as methyl, ethyl or propyl. Rf is a partially fluorinated alkyl radical of 3 to 16 carbon atoms or a partially fluorinated, ether bond-containing monovalent saturated radical, especially a straight or branched alkyl radical in which some hydrogen atoms are substituted with fluorine atoms and one or more ether-forming oxygen atoms, preferably 1 to 6 ether-forming oxygen atoms intervene. Typical examples of Rf are shown below.

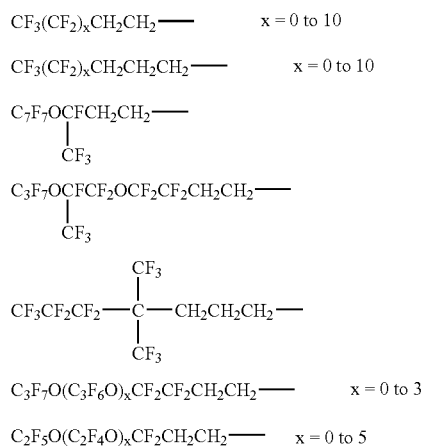

The letter n has an average value of 1.5 to 6.0 to be appropriately selected to adjust the physical properties of cured products.

Examples of the organosilicon compound of formula (1) are given below. It is noted that these compounds may be used alone or in admixture of two or more.

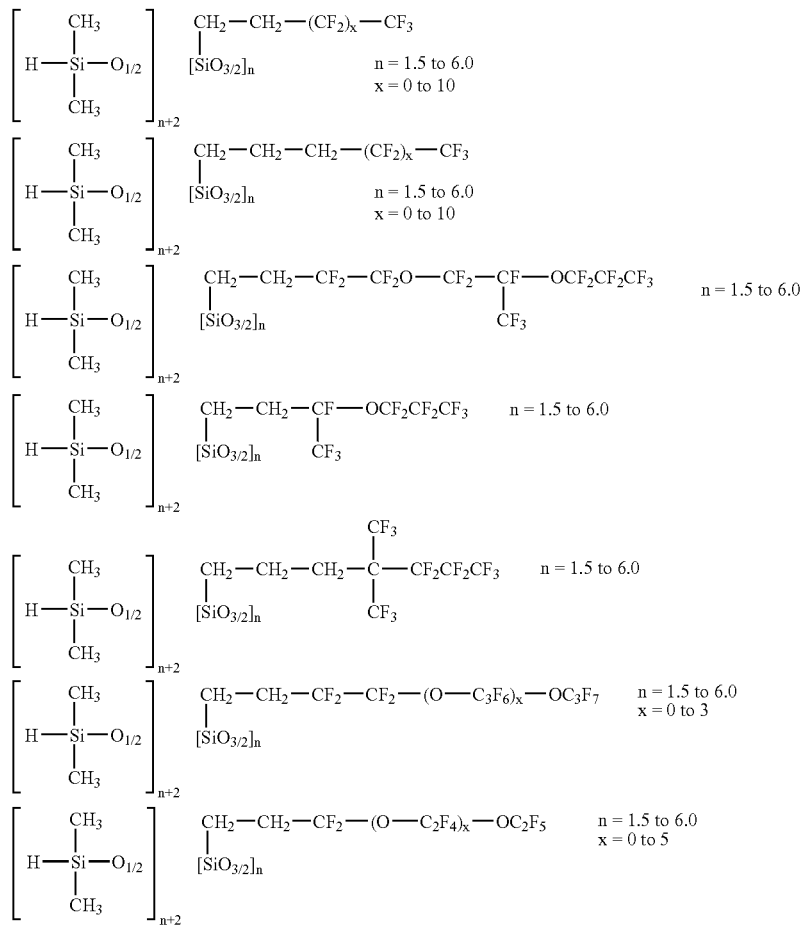

Component (B) is blended in an effective amount to cure component (A). Usually, component (B) having hydrosilyl radicals is blended in such an amount that preferably 0.5 to 5 moles, and more preferably 1 to 2 moles of hydrosilyl (or SiH) radicals may be present per mole of alkenyl radicals (such as vinyl, allyl, cycloalkenyl radicals) in the entire composition, especially in component (A). On this basis, less than 0.5 mole of hydrosilyl radicals may achieve an insufficient degree of crosslinking. More than 5 moles of hydrosilyl radicals may allow chain lengthening to become preferential, inviting undercure, foaming, and losses of heat resistance and compression set.

Component (C) is a hydrosilylation catalyst which is preferably selected from transition metals, for example, platinum group metals such as Pt, Rh and Pd, and compounds of transition metals. Most of these compounds are noble metal compounds which are expensive. Platinum and platinum compounds are thus used because they are readily available.

Exemplary platinum compounds include chloroplatinic acid, complexes of chloroplatinic acid with olefins such as ethylene, complexes of chloroplatinic acid with alcohols and vinylsiloxanes, and platinum supported on silica, alumina or carbon though not limited thereto. Known platinum group metal compounds other than the platinum compounds include rhodium, ruthenium, iridium, and palladium compounds, for example, $RhCl(PPh_3)_3$, $RhCl(CO)(PPh_3)_2$, $RhCl(C_2H_4)_2$, $Ru_3(CO)_{12}$, $IrCl(CO)(PPh_3)_2$, and $Pd(PPh_3)_4$ wherein Ph denotes phenyl.

The amount of the catalyst used is not critical. A catalytic amount can achieve a desired curing rate. The catalytic amount varies depending on the form and concentration of the catalyst, that is, whether or not the catalyst is supported on a carrier such as silica or alumina and whether or not the catalyst is diluted with a solvent. From the economical aspect and to obtain satisfactory cured products, the platinum group metal compound is preferably added in an amount of 0.1 to 1,000 parts, more preferably 0.1 to 500 parts by weight calculated as the platinum group metal per million parts by weight of the entire curable composition.

Insofar as the benefits of the invention are not impaired, various well-known additives may be added to the inventive composition in addition to the above essential components (A) to (C). Typical additives are fillers which are used for reinforcing the curable fluoropolyether composition. Preferred are silica fillers, which include dry silica known as fumed silica, wet silica known as precipitated silica, and ground silica. These silicas may have been surface treated with organochlorosilanes, silazane compounds and cyclic silazane compounds that act on hydroxyl radicals attached to silicon atoms on the surface. Alternatively, silica may be made hydrophobic through surface treatment with dimethylpolysiloxane having a low degree of polymerization.

Other useful additives include regulators of the hydrosilylation catalyst, for example, acetylene alcohols such as 1-ethynyl-1-hydroxycyclohexane, 3-methyl-1-butyn-3-ol, 3,5-dimethyl-1-hexyn-3-ol, 3-methyl-1-penten-3-ol, and phenylbutynol, as well as 3-methyl-3-penten-1-yn and 3,5-dimethyl-3-hexen-1-yn; tackifiers, for example, organosiloxanes having alkoxy, epoxy and SiH radicals in the molecule such as the compound of formula (5) shown below; pigments such as iron oxide, cerium oxide and carbon black; colorants, dyes, and antioxidants.

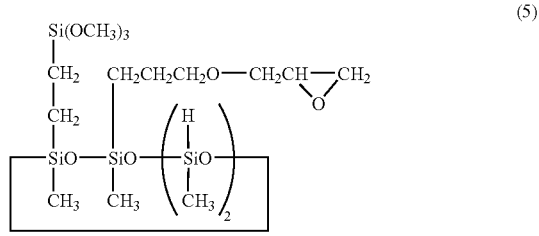

(5)

Depending on its application, the composition of the invention is formulated as a single composition having all the essential components (A) to (C) incorporated therein, that is, of one part type. Alternatively, the composition is formulated to two part type, for example, one part containing a part of (A) and (B) and the other part containing the balance of (A) and (C) whereupon the two parts are mixed on use.

The composition of the invention will readily cure when it is allowed to stand at room temperature or by heating. Often, the composition is preferably cured at room temperature (e.g., 10–30° C.) to about 180° C. for about 24 hours to about 5 minutes.

The compositions of the invention are suitable for use as molded rubber parts such as diaphragms, valves and sealing parts (e.g., O-rings, oil seals, packing, gaskets, joints and face seals) where chemical resistance and oil resistance are required when such parts are used in the fields of automobiles, chemical plant components, business machines (e.g. copiers and ink jet printers), semiconductor components, semiconductor manufacturing lines, analytic and scientific instruments, medical equipment components, aircraft components, fuel cells, etc. They are also suitable as gel materials, adhesives, (sensor) potting compounds, tent film materials, sealants, molded parts, extruded parts, coatings, copier roll materials, moisture-proof coatings for electric use, laminate rubber fabric, and protective materials for automotive pressure sensors, and materials for the protection and damping of automobile-mounted electronic parts.

More specifically, rubber articles made of the cured compositions include rubber parts for automobiles, for example, diaphragms such as fuel regulator diaphragms, pulsation damper diaphragms, oil pressure switch diaphragms, and EGR diaphragms, valves such as canister valves and power control valves, O-rings such as quick connector O-rings and injector O-rings, and seals such as oil seals and cylinder head gaskets;

rubber parts for chemical plants, for example, pump diaphragms, valves, O-rings, packings, oil seals, and gaskets;

rubber parts for ink jet printers and semiconductor manufacturing lines, for example, diaphragms, valves, O-rings, packings, and gaskets;

rubber parts for analytical and scientific instruments and medical equipment, for example, pump diaphragms, O-rings, packings, valves, and joints;

tent film materials, sealants, molded parts, extruded parts, coatings, copier roll materials, electrical moisture-proof coatings, sensor potting materials, fuel cell seals, laminate rubber fabrics; and rubber parts for aircraft, for example, O-rings, face seals, packings, gaskets, diaphragms, and valves in fluid piping for engine oil, jet fuel, hydraulic oil and Skydrol®.

EXAMPLE

Examples of the invention are given below by way of illustration and not by way of limitation. All parts are by weight. Me is methyl.

Example 1

Hundred parts of a fluoropolyether compound of formula (6) below (vinyl radical concentration $1.20 \times 10^{-4}$ mol/g, fluorine content 67 wt %) was mixed with 4.4 parts of an organosilicon compound of formula (7) below as a curing agent. After the vanishment of air bubbles that were introduced during the mixing operation, the mixture became uniform and transparent. To the mixture were added 0.2 part of a 50% toluene solution of 1-ethynyl-1-hydroxycyclohexane as a regulator and 0.4 part of a toluene solution of chloroplatinic acid modified with a compound of formula (8) below (platinum concentration 0.5 wt %) as a hydrosilylation catalyst. Thorough mixing and press curing at 150° C. for 10 minutes yielded a transparent rubbery cured product. Table 1 shows the state of the composition prior to curing and the physical properties (hardness) of the cured product.

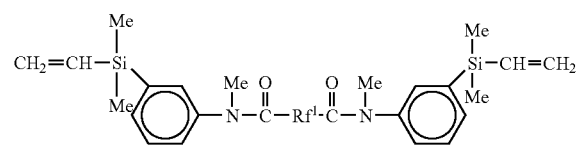

(6)

Herein $Rf^1$ represents

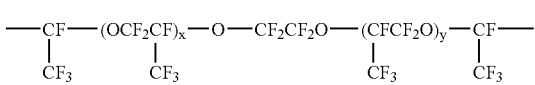

wherein X+Y is 95 on average.

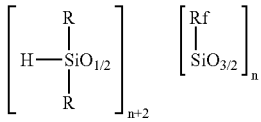

(7)

Herein n has an average value of 2.0, R is —CH$_3$, and Rf is —CH$_2$CH$_2$(CF$_2$)$_7$CF$_3$.

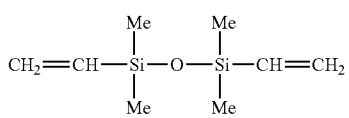

(8)

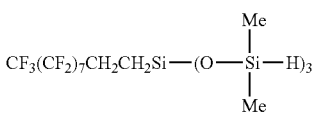

(11)

Example 2

A cured product was prepared as in Example 1 except that 5.8 parts of a compound of formula (9) was used as the curing agent. The curing agent dissolved in the fluoropolyether compound uniformly. Table 1 shows the state of the composition prior to curing and the physical properties (hardness) of the cured product.

TABLE 1

|  | State of uncured mixture | Hardness (JIS A) of cured product |
| --- | --- | --- |
| Example 1 | uniform, transparent | 24 |
| Example 2 | uniform, transparent | 32 |
| Comparative Example 1 | 2 phases separated, turbid | 30 |
| Comparative Example 2 | uniform, transparent | 18 |

It is seen that as compared with Comparative Examples, Examples have the advantage that the composition is uniform prior to curing and has a high hardness after curing.

Example 3

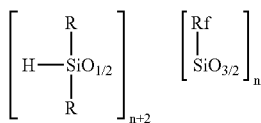

(9)

Herein n has an average value of 4.0, R is —CH$_3$, and Rf is —CH$_2$CH$_2$(CF$_2$)$_7$CF$_3$.

Comparative Example 1

Hundred parts of the fluoropolyether compound used in Example 1 was mixed with 3.5 parts of a compound of formula (10) below as a curing agent. Even after the vanishment of air bubbles, the mixture remained white turbid. It was allowed to stand for some time whereupon it separated into two phases. As in Example 1, the regulator and the hydrosilylation catalyst were added to the mixture. Press curing under the same conditions yielded a transparent rubbery cured product. Table 1 shows the state of the composition prior to curing and the physical properties (hardness) of the cured product.

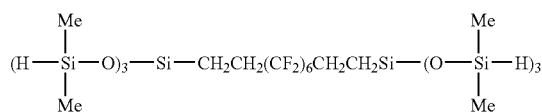

(10)

Comparative Example 2

A cured product was prepared as in Example 1 except that 3.4 parts of an organosilicon compound of formula (11) was used as the curing agent. Table 1 shows the state of the composition prior to curing and the physical properties (hardness) of the cured product.

Using a planetary mixer, 100 parts of the fluoropolyether compound used in Example 1 was mixed with 18 parts of fumed silica surface treated with dimethyldichlorosilane. The mixture was subjected to heat treatment at 150° C. for 4 hours and then dispersion treatment on a three-roll mill. To 118 parts of the fumed silica-loaded fluoropolyether compound were added 5.8 parts of the curing agent used in Example 2, 0.2 part of the regulator and 0.4 part of the hydrosilylation catalyst, both used in Example 1. The composition thus obtained was in a milky white, flowing, high viscosity oil form. The composition was press cured at 150° C. for 10 minutes into a cured product. Table 2 shows the state and viscosity (Brookfield rotation viscometer, 23° C.) of the composition prior to curing and the physical properties (hardness) of the cured product.

Comparative Example 3

A composition was prepared as in Example 3 except that the curing agent was changed to 3.5 parts of the curing agent used in Comparative Example 1. The composition was in a non-flowing, grease form. The composition was cured under the same conditions as in Example 3 into a cured product. Table 2 shows the state and viscosity of the composition prior to curing and the physical properties (hardness) of the cured product.

TABLE 2

|  | Viscosity (Pa · s) of uncured composition | State of uncured composition | Hardness (JIS A) of cured product |
| --- | --- | --- | --- |
| Example 3 | 1500 | flowing | 62 |
| Comparative Example 3 | 2500 | non-flowing, pasty | 61 |

Although the hardness of cured products is on the same level between Example 3 and Comparative Example 3, the uncured composition of Example 3 is easy to work because of good fluidity and low viscosity.

The curable fluoropolyether compositions of the invention are curable at room temperature or under heat, are smoothly flowing due to a low viscosity, non-turbid and transparent, and exhibit improved water repellence, oil repellence, solvent resistance, chemical resistance and weather resistance. They are useful as rubber articles such as diaphragms, valves and O-rings in automobiles and the like.

Japanese Patent Application No. 2002-212658 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A curable fluoropolyether composition comprising
(A) a base polymer consisting of a fluoropolyether compound containing alkenyl radicals in a concentration of $3 \times 10^{-5}$ to $5 \times 10^{-3}$ mol/g and having a fluorine content of at least 40% by weight, the alkenyl radicals being attached either directly to both ends of the backbone of the fluoropolyether compound, wherein the fluoropolyether compound (A) is one having the following formula (1):

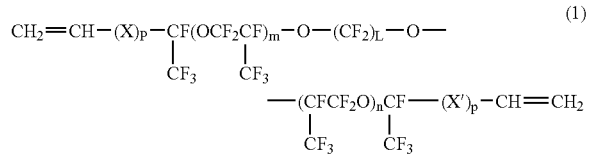

(1)

wherein X is independently selected from among —CH$_2$—, —CH$_2$O— and —Y—NR$^1$—CO—, wherein Y is —CH$_2$— or a radical of the following structural formula (Z):

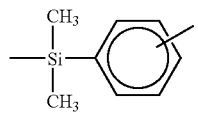

(Z)

wherein the bond may be at o, m or p-position and R$^1$ is hydrogen, methyl, phenyl or allyl, X' is independently selected from among —CH$_2$—, —OCH$_2$— and —CO—NR$^2$—Y'—, wherein Y' is —CH$_2$— or a radical of the following structural formula (Z'):

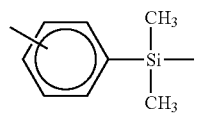

(Z')

wherein the bond may be at o, m or p-position and R$^2$ is hydrogen, methyl, phenyl or allyl, and p is independently equal to 0 or 1, L is an integer of 2 to 6, and m and n each are an integer of 0 to 200, (B) a crosslinking agent or chain extender consisting of an organosilicon compound having the average compositional formula (2):

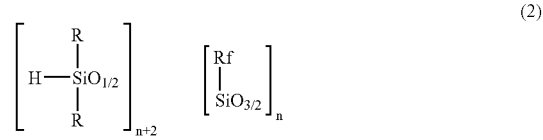

(2)

wherein R is an alkyl radical of 1 to 3 carbon atoms, Rf is a partially fluorinated alkyl radical of 3 to 16 carbon atoms or a partially fluorinated, ether bond-containing monovalent saturated radical, and n has an average value of 1.5 to 6.0, and (C) a hydrosilylation catalyst, components (B) and (C) being used in effective amounts for component (A) to cure.

2. A rubber article comprising the curable fluoropolyether composition of claim 1 in the cured state.

3. The rubber article of claim 2 which is suitable for use in automobiles, chemical plants, ink jet printers, semiconductor manufacturing lines, analytic and scientific instruments, medical equipment, aircraft or fuel cells.

4. The rubber article of claim 2 which is in the form of a diaphragm, valve, O-ring, oil seal, gasket, packing, joint or face seal.

5. The curable fluoropolyether composition of claim 1 wherein Rf in formula (2) is selected from the group consisting of the following formulae:

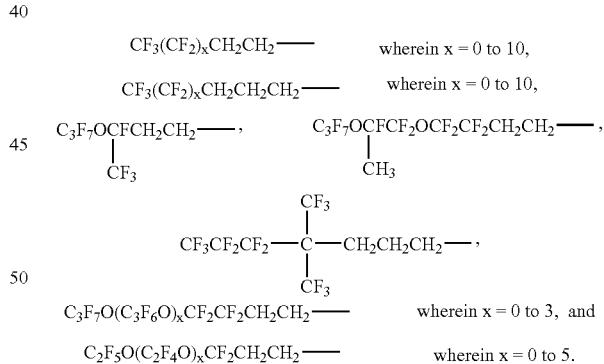

6. The curable fluoropolyether composition of claim 1 wherein component (B) is blended in such an amount that 0.5 to 5 moles of hydrosilyl radicals are present per mole of alkenyl radicals in the entire composition.

* * * * *